July 19, 1960 H. NEUMANN 2,945,919
FERRITE MAGNETIC HEADS
Filed Jan. 19, 1956
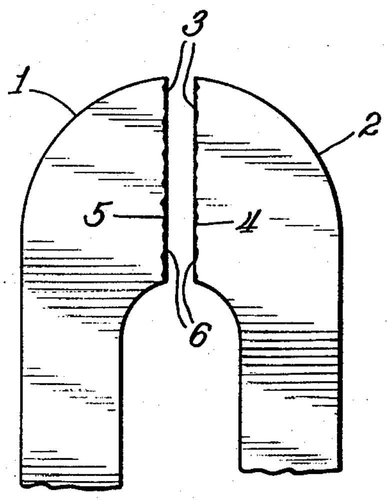
INVENTOR.
Helmut Neumann
BY
[signature]
Att'y.

United States Patent Office 2,945,919
Patented July 19, 1960

2,945,919

FERRITE MAGNETIC HEADS

Helmut Neumann, Karlsruhe, Germany, assignor to Siemens & Halske Aktiengesellschaft, Munich and Berlin, Germany, a corporation of Germany Filed Jan. 19, 1956, Ser. No. 560,255

Claims priority, application Germany Aug. 5, 1955

6 Claims. (Cl. 179—100.2)

The present invention is concerned with ferrite magnetic heads for magnetic recording and reproducing in a wide frequency range.

It was impossible until now to produce in ferrite magnetic heads a gap of a width in the desired order of magnitude of a few microns. The reason resides in the brittleness and in the crystal structure of the ferrite material which stand in the way of providing the gap surfaces with high-grade plane polish. In spite of most careful polishing, there remains a certain roughness which increases the effective gap width unfavorably. Ferrite magnetic heads have as compared with iron magnetic heads the advantage that there are no eddy current losses but they require extremely narrow gaps for the transmission, for example, of television picture frequencies. The desired gap width amounts to about $1\mu$.

The invention avoids the above-indicated drawbacks by covering the surfaces forming the gap of the magnetic head with a layer of ferromagnetic material of substantially identical or higher permeability than the ferrite ceramic material of the head. It is suitable to polish the gap surfaces prior to providing thereon the covering layers.

It is in accordance with the invention possible to provide the material of the covering layer or layers on the gap surfaces electrochemically. The covering layers may also be provided on the gap surfaces by vaporization especially when it is desired to produce thin adhering layers of the gap surface material. Cathode vaporization may likewise be employed for providing on the relatively rough gap surfaces of a ferrite head the covering layers. Iron such as iron from carbonyliron, nickel or iron-nickel such as nickel from nickel carbon $Ni(CO)_4$ alloys are preferred materials for the formation of the layers forming the gap surfaces.

In accordance with the invention, the gap surface material, for example, an iron-nickel alloy, fills the fissures and crevices of the gap surfaces of the magnetic head. The covering of the gap surfaces is continued beyond this filling until a homogeneous layer or coating of preferably $40\mu$ is formed which provides sufficient material for obtaining exact surface planes upon polishing the gap surface.

The technical advance of the invention resides among others therein that ferrite magnetic heads can now be provided with gap widths equal to those that may be obtained in the case of iron magnetic heads. It is accordingly possible to use ferrite heads advantageously for the transmission of television picture frequencies, such heads being, as mentioned before, with regard to losses and extended transmission properties superior to magnetic heads made of laminated iron sheet. The invention also makes it possible to use ferrite of larger structure resulting in the considerable advantage of making available a high permeability of the ferrite material.

An example of the invention is shown in the accompanying drawing on a very much enlarged scale.

Referring to the drawing, numerals 1 and 2 indicate the gap-defining ferrite parts of a magnetic head exhibiting smooth gap surfaces 3. These smooth surfaces are in accordance with the invention obtained by polishing layers of finely divided ferromagnetic material 6 provided as previously described on the relatively rough ferrite surfaces 4 and 5.

Changes may be made within the scope and spirit of the appended claims which define what is believed to be new and desired to have protected by Letters Patent.

I claim:

1. A ferrite magnetic head for operation within a wide frequency range comprising a pair of ferrite ceramic members having lateral opposing gap surfaces, wherein fissures and crevices of said ferrite ceramic gap surfaces are filled by gap-defining layers of a finely granular ferromagnetic material of a permeability which is substantially equal to or higher than that of the said members.

2. A magnetic head according to claim 1, wherein said gap-defining layers are deposits of iron derived from carbonyliron.

3. A magnetic head according to claim 1, wherein said gap-defining layers are deposits of nickel derived from nickel carbonyl.

4. A magnetic head according to claim 1, wherein said gap-defining layers are formed from materials from the class of materials consisting of iron, nickel and alloys thereof.

5. A magnetic head according to claim 1, wherein said gap-defining layers are galvanic coatings upon electrically conducting coatings.

6. A magnetic head according to claim 1, wherein said gap-defining layers are homogeneous layers substantially 40 microns in the thickness so that exact surface planes are formed upon polishing the gap surfaces to form a gap of a width in magnitude within the range from substantially 1 micron to a few microns.

References Cited in the file of this patent

UNITED STATES PATENTS

| | | |
|---|---|---|
| 2,594,414 | Garreau | Apr. 29, 1952 |
| 2,676,393 | Buhrendorf | Apr. 27, 1954 |
| 2,711,945 | Kornei | June 28, 1955 |
| 2,715,659 | Ibuka et al. | Aug. 16, 1955 |
| 2,836,881 | Pollock | June 3, 1958 |